US006827864B2

(12) United States Patent
Kangasniemi et al.

(10) Patent No.: US 6,827,864 B2
(45) Date of Patent: Dec. 7, 2004

(54) FILTERING APPARATUS AND METHOD FOR WASHING ITS FILTERING ELEMENTS

(75) Inventors: Marko Kangasniemi, Vesilahti (FI); Petri Tapola, Forssa (FI); Tuomo Koivula, Tampere (FI)

(73) Assignee: Parker Hannifin Oy, Urijala as (FI)

(*) Notice: Subject to any disclaimer, the term of this patent is extended or adjusted under 35 U.S.C. 154(b) by 0 days.

(21) Appl. No.: 10/660,392

(22) Filed: Sep. 11, 2003

(65) Prior Publication Data

US 2004/0050803 A1 Mar. 18, 2004

Related U.S. Application Data

(63) Continuation of application No. 10/090,512, filed on Mar. 4, 2002, now abandoned, and a continuation of application No. PCT/FI00/00800, filed on Sep. 20, 2000.

(30) Foreign Application Priority Data

Sep. 20, 1999 (FI) .............................................. 19991997

(51) Int. Cl.[7] .............................................. B01D 29/68
(52) U.S. Cl. .................... 210/791; 210/333.1; 210/355; 210/411
(58) Field of Search ............................ 210/143, 333.01, 210/333.1, 354, 355, 411–415, 739, 791

(56) References Cited

U.S. PATENT DOCUMENTS

| 3,169,109 A | * | 2/1965 | Hirs ............................ 210/107 |
| 3,176,846 A | * | 4/1965 | Adams ....................... 210/333.1 |
| 3,176,946 A |   | 4/1965 | Adams |
| 3,380,591 A | * | 4/1968 | Muller ........................ 210/143 |
| 3,476,248 A | * | 11/1969 | Adams ........................ 210/153 |
| 4,482,461 A | * | 11/1984 | Hindman et al. ........... 210/741 |
| 6,596,165 B2 | * | 7/2003 | Koivula ................... 210/323.2 |

FOREIGN PATENT DOCUMENTS

| DE | 40 30 084 A1 | 3/1992 |
| DE | 43 40 275 A1 | 6/1995 |

OTHER PUBLICATIONS

Copy of corresponding International Publication No. WO 01/21280 A1.

* cited by examiner

Primary Examiner—Matthew O. Savage
(74) Attorney, Agent, or Firm—Christopher H. Hunter (57) ABSTRACT

A filtering apparatus and method comprises parallel filtering elements backflushable with the pressure of the filtered flow. At least one washing organ connecting alternately to the different filtering elements, forms a discharge channel for the washing flow. A freewheel clutch is connected to a rotating axle of the washing organ, converting reciprocating movement generated with the pressure of flow in the filtering apparatus and with pressure alternating with it into a continuously parallel, stepping rotary movement of the washing organ. The mechanism containing the clutch may be outside the filtering room of the apparatus, and based on the alternation of the higher pressure of the flow filtered in the apparatus and the lower pressure from the discharge channel. The freewheel clutch is articulated to a piston in the cylinder, and is moved back and forth with the pressure difference, controlled by the channels relaying the pressure and by the valves.

19 Claims, 6 Drawing Sheets

FILTERING APPARATUS AND METHOD FOR WASHING ITS FILTERING ELEMENTS

CROSS REFERENCE TO RELATED APPLICATIONS

This application is a continuation of U.S. application Ser. No. 10/090,512 filed Mar. 4, 2002, now abandoned, and copending International Application No. PCT/FI00/00800, filed Sep. 20, 2000, which designated the United States, the disclosures of which are incorporated herein by reference, and claims priority to Finish Patent Application 19991997, filed Sep. 20, 1999.

FIELD OF THE INVENTION

The invention relates to a filtering apparatus, comprising an inlet channel for the flow to be filtered, an outlet channel for the filtered flow, a number of parallel filtering elements, into which the flow to be filtered may be directed so that the infiltration occurs out of the element through the element jacket, and at least one rotating washing organ connecting alternately to different elements for forming an outlet channel for the backflushing of elements generated with the pressure of the filtered flow. Further, the invention relates to a method for washing the filtering elements of the apparatus.

BACKGROUND OF THE INVENTION

A filtering device is needed especially in motors as a fuel or luboil filter, with the continuous backflushing of which the operation of the motor is ensured in long-term continuous use. The apparatus typically comprises a large number of filtering elements, the main part of which is continuously in operation while the washing is conducted in one or several elements at a time, depending on the number of washing arms.

A state-of-the art backflushable filtering apparatus has been described in the patent publication DE-4 340 275. The apparatus comprises parallel, candle-shaped filtering elements arranged around a vertical axle as two nested rings. The flow to be filtered is directed into the elements from their upper and lower ends, and the infiltration occurs out of the element through the cylindrical jacket of each element. For backwashing the elements, a washing organ consisting of two washing arms of different lengths is arranged below them, the arms being fastened to the rotatable vertical axle of the apparatus. The washing arms are arranged to alternately connect to the lower ends of different filtering elements so that they form outlet channels for the washing flow. Corresponding to the washing arms, closers are attached to the rotating axle of the apparatus above the filtering elements, the closers closing the upper end of the filtering element in question for the duration of the washing stage, thus preventing the flow to be filtered from mixing with the washing flow.

According to the publication DE-4 340 275, the rotating movement of the vertical axle of the apparatus and the washing arms is achieved with the help of a turbine rotor arranged in the inlet channel of the flow to be filtered and with cogwheels connected to it and acting as a transmission mechanism. The movement of the washing arms is thus maintained by the motion energy of the flow coming into the apparatus.

The drawback of the solution in the publication DE-4 340 275 is that the rotation of the washing arms is dependent on the flow rate of the flow to be filtered coming into the apparatus, which may vary. If the flow rate is too high, it makes the washing arms to rotate too fast, and the washing periods of the filtering elements remain too short; and again, if the flow rate is too low, the washing arms rotate too slowly from one element to the other, or they stop altogether, if the decelerated flow cannot rotate the turbine rotor any more. The rotation of the washing arms is hindered by the rotor and the transmission mechanism getting dirty, and due to the structure of the apparatus, it is difficult to service the mechanism.

SUMMARY OF THE INVENTION

The object of the invention is to provide a solution, in which the axle of the apparatus and one or several washing organs are rotated by utilising the flow pressure present in the apparatus so that the drawbacks associated with the state-of-the art technology can be avoided. It is characteristic of the filtering apparatus of the invention that a freewheel clutch is connected to the rotating axle of the washing organ, which converts the reciprocating motion generated by the pressure of the flow present in the apparatus and by the lower pressure alternating with it into a continuously parallel, stepping rotary motion of the washing organ.

According to the invention, the rotation of the washing organ and the washing periods in different filtering elements are generated with a pressure difference, which it is possible to keep substantially constant, or which varies less than the flow rate of the flow coming into the apparatus. This ensures that the sufficiently long washing periods are repeated with a suitable frequency in all filtering elements of the apparatus.

A substantial advantage of a second solution of the invention is that the freewheel clutch may be arranged outside the filtering room of the apparatus, connected to the rotating axle, so that it is easy to service the freewheel clutch and other organs maintaining the rotating movement, and the service may be carried out while the filtering continues.

The freewheel clutch may consist of an actuator driving the rotating axle of the washing organ, which is alternately in sliding contact with the axle and which alternately locks into it so that the axle rotates along with the organ. The movement of the actuator may be generated, for example, by articulating it to a piston reciprocating on the alternating pressure.

The pressure of the filtered flow is especially advantageously used for rotating the washing organ, by arranging the said flow to influence the said piston or another organ driving the freewheel clutch. The filtered flow is pure, so that it contaminates the rotating mechanism substantially less than an unfiltered flow. The apparatus of the invention preferably comprises channels and related control valves for connecting the pressure of the filtered flow and the lower counterpressure alternately to different sides of the piston.

The lower pressure opposite the said pressure of the filtered flow may be the pressure prevailing in the outlet channel for the washing flow of the apparatus, to which the piston or another actuator may be connected. In the filters of a motor, the outlet channel is generally in the atmospheric pressure prevailing in the surroundings.

The solution of the invention makes it possible to hydraulically adjust the rotating movement of the washing organ so that the frequency and duration of the washing periods may be controlled with it. The movement of the washing organ may thus be damped, or it may be stopped exactly at the place of the element to be washed, in which the washing organ remains for a desired time before the movement continues.

In the method of the invention, the filtering elements are washed in the filtering apparatus, comprising an inlet channel for the flow to be filtered, an outlet channel for the filtered flow, and a number of parallel filtering elements, into which the flow to be filtered is directed so that the infiltration occurs out of the element through the element jacket. The washing is achieved by coupling alternately different filtering elements to the rotary washing organ so that the washing occurs as backflushing directed to the washing organ with the pressure of the filtered flow. Essential in the method is that the rotating axle of the washing organ is rotated continuously in the same direction in a stepping manner using a mechanism, the reciprocating movement of which is generated with the pressure of the flow in the apparatus and with the lower pressure alternating with this. The former pressure is advantageously the pressure of the clean flow filtered in the apparatus, and the lower pressure is the ambient pressure present in the washing arm.

In the method, the steps of the washing organ may be generated with a freewheel clutch, comprising an organ driving the rotating axle of the washing organ, which is alternately in sliding contact with the axle and which alternately locks into it for rotating the axle, the said organ being moved with a piston articulated with it, the piston being reciprocated by coupling the said pressures of different sizes alternately to its different sides.

DETAILED DESCRIPTION OF THE PREFERRED EMBODIMENT

Figure 1:
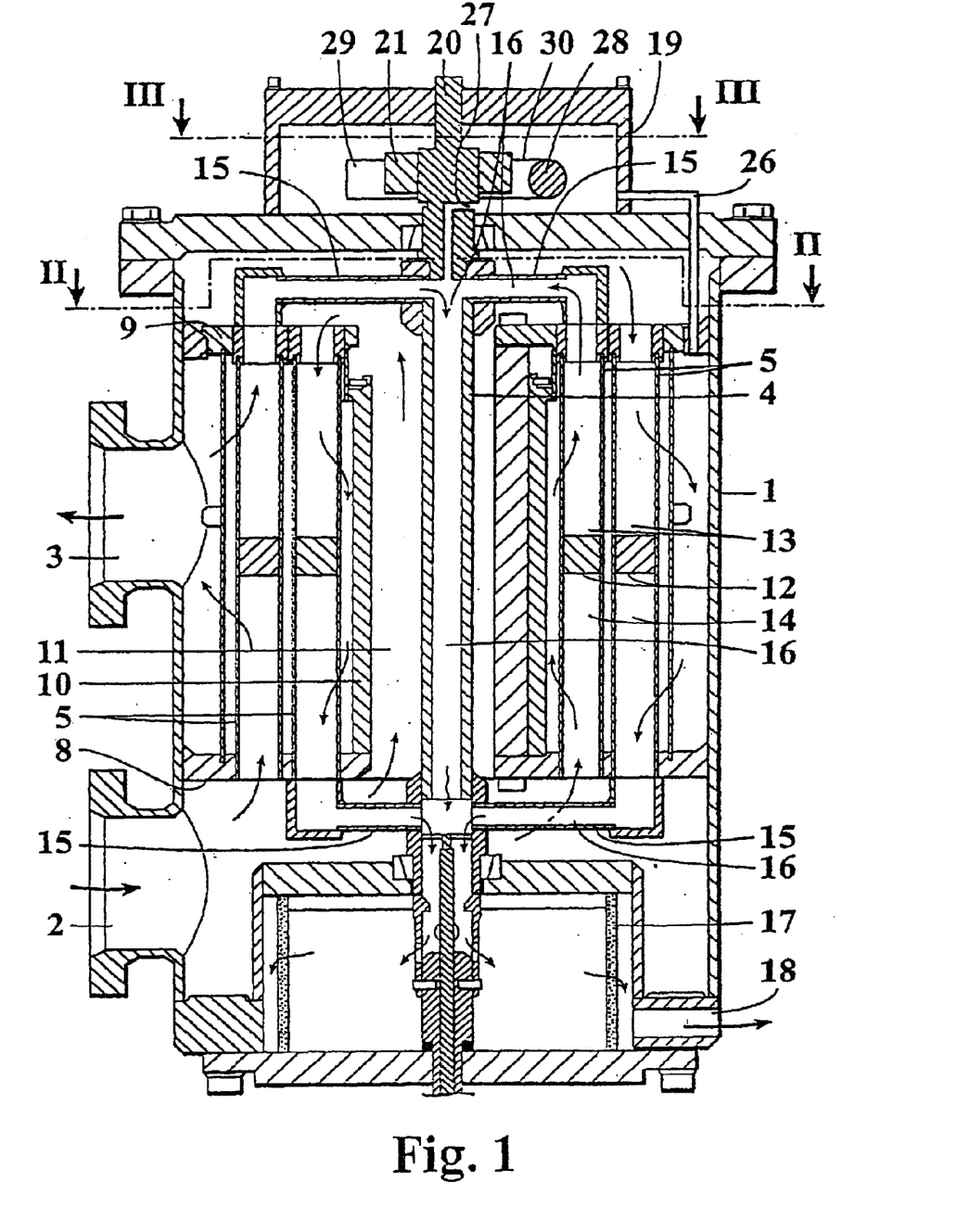
FIG. 1 is a vertical section of a filtering apparatus of the invention.
Figure 2:
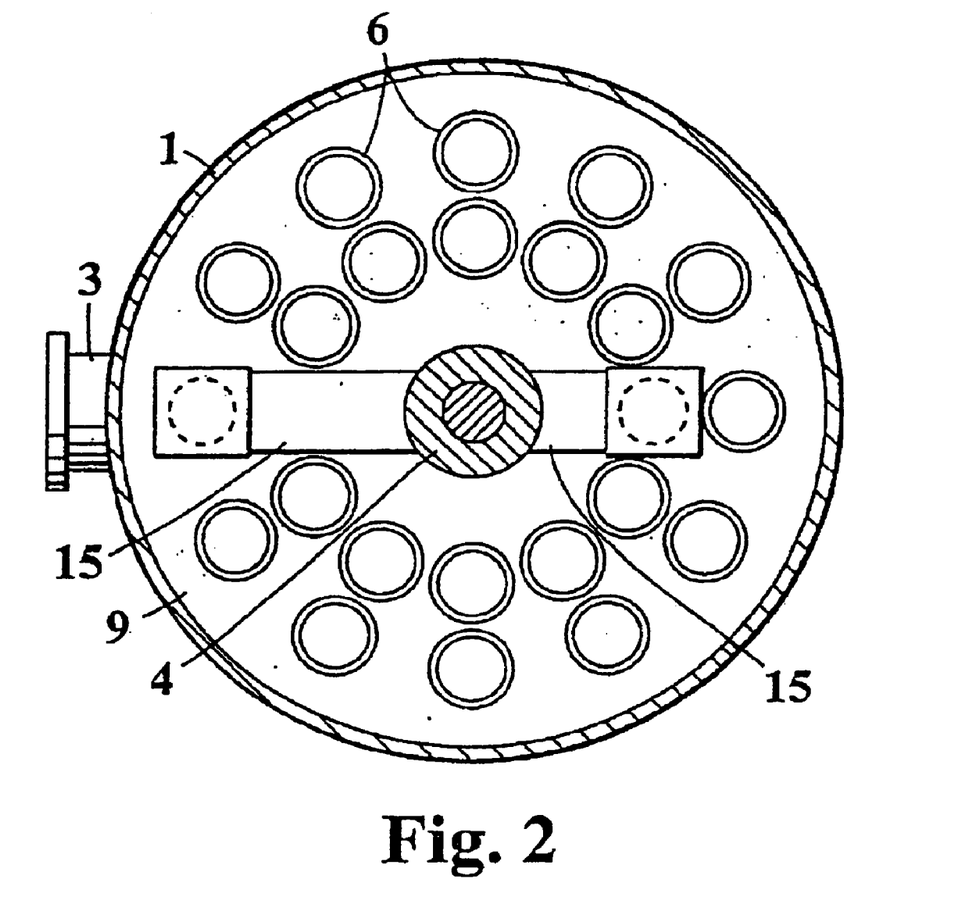
FIG. 2 is a horizontal section II—II of FIG. 1, in which the parallel filtering elements of the apparatus and the washing organs above them are shown.

In FIGS. 1 and 2, there is shown a filtering apparatus, which may work, for example, as the luboil filter of a diesel motor, continuously filtering oil as the motor is running. The apparatus comprises a jacket 1, an inlet channel 2 for the flow to be filtered, an outlet channel 3 for the filtered flow, and a number of longitudinal, candle-shaped filtering elements 5 arranged as two nested rings around the middle axis 4 of the apparatus. The jackets of the elements 5 are made of porous filtering material, which retains the solid particles or other impurities in the flow as the flow extends from the interior of the elements through the jacket and out of the elements. For directing the flow to be filtered into the elements 5, each element is open both from its upper end 6 and lower end 7. The spaces between the ends 6, 7 of adjacent filtering elements are closed with a horizontal plate 8, 9 both at the lower and the upper end of the elements. The plates 8, 9 are further connected to each other with a vertical, cylindrical wall 10, which confines in its interior a vertical flow channel 11 for the flow to be filtered. Thus, the flow can spread into the space restricted by the jacket 1, from where it is transferred into the elements through the open ends 6, 7 of the filtering elements 5, extends through the element jackets out of the elements and is discharged as purified into the outlet channel 3.

In the apparatus according to FIG. 1, each of the candle-shaped filtering elements 5 is divided in two by a horizontal, solid partition 12. Each element 5 thus comprises an upper part 13 open from its upper end and a lower part 14 open from its lower end, through which the flows to be filtered travel independent from each other.

During the filtering process, the solid material gathering to the inner surfaces of the jackets of the filtering elements 5 gradually blocks pores of the jacket, thus causing a decrease in the filtering capacity. In order to maintain the operation of the elements, the apparatus is provided with backflushing, which is conducted with the pressure of the filtered flow in the direction opposite to the flow to be filtered through the element jackets, i.e. from the outside of the jackets into them. Above and below the adjacent elements 5, washing organs 15 connecting alternately to different ends 6, 7 of the elements are arranged for coupling the elements to the lower pressure for generating the washing flow. Both washing organs consist of two washing arms 15, the lengths of which are equal to the radii of the nested rings formed by the elements. The washing arms are made of a hollow tube, and they are fastened to the likewise hollow middle axle 4 of the apparatus so that together they work as discharge channels 16 for the washing flow cleaning the element. The discharge channels 16 are directed to the lower part of the apparatus, from where the washing flow is suitably discharged, for example, to the discharge assembly 18 in atmospheric pressure, after having passed through the filter 17.

In the apparatus described, the backflushing works so that the axle 4 with the washing arms 15 fastened to it performs a rotating movement counter clockwise so that the washing arms connect from their ends alternately to the ends 6, 7 of different filtering elements 5, thus coupling the interiors of these elements to a pressure which is lower than the pressure of the filtered flow in the discharge channels 16 and the discharge assembly 18, thus generating the backflushing. The washing occurs in the part between the end of the element 5 and the partition 12 at the same time as the opposite end of the element is open so that the filtering may continue in the part restricting to the said open end of the element. Thus, FIG. 1 presents a situation, in which the filtering continues in the lower part 14 of the leftmost element, while the upper part 13 of the element experiences backflushing, and the filtering continues in the upper part 13 of the rightmost element at the same time as the lower part 14 of the element experiences backflushing. Further, the filtering is naturally in constant operation in those filtering elements, which are not connected to the washing arms 15. During the process, the lower and upper part of each filtering element is cleaned by backflushing at regular intervals so that the filtering capacity of the whole apparatus is kept substantially constant in the process.

Figure 3:
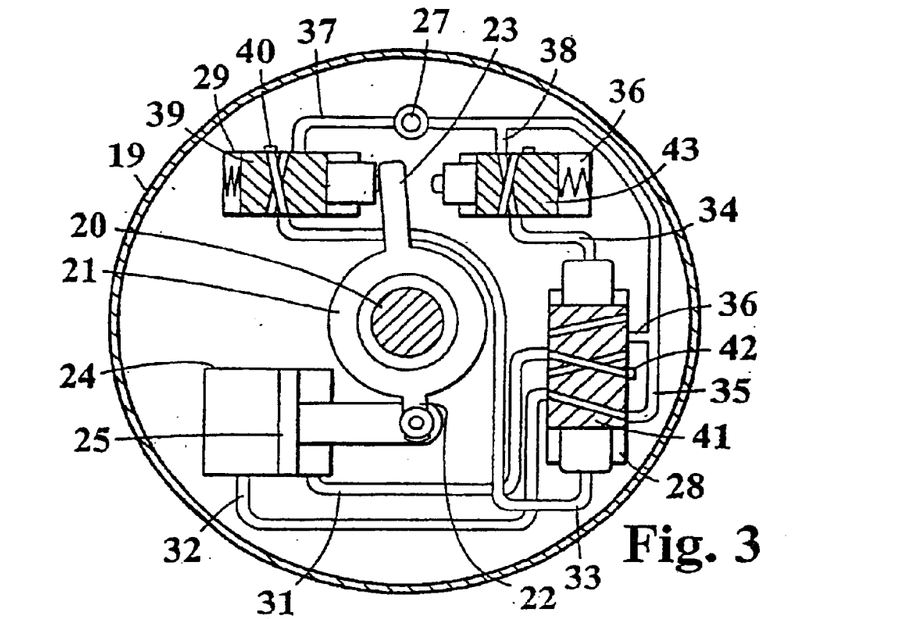
FIG. 3 shows the freewheel clutch and control valves connected to it for rotating the axle of the apparatus in the one extreme position of the coupling movement, as a section III—III of FIG. 1.
Figure 4:
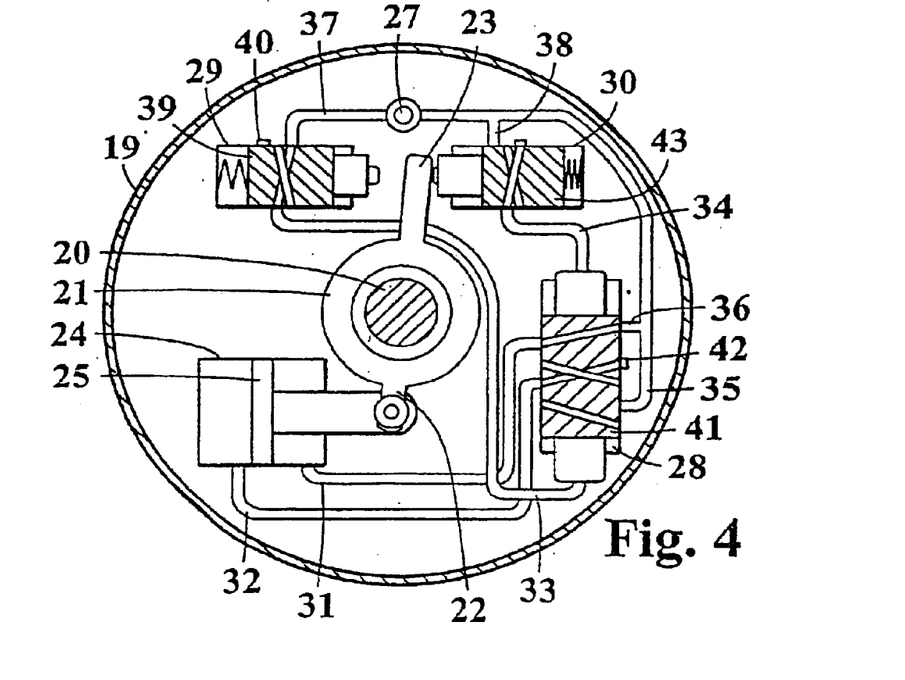
FIG. 4 is a similar view to FIG. 3, presenting the freewheel clutch in its other extreme position.

The rotating movement of the construction consisting of the axle 4 belonging to the apparatus and of the washing arms 15 rigidly attached to the axle is generated with a mechanism, the structure and operation of which may be seen in FIGS. 3 and 4. The rotating mechanism is arranged into the casing 19 above the filtering space defined by the jacket 1 of the apparatus, the end 20 of the axle 4 of the apparatus extending into this casing. The axle 20 is driven by a freewheel clutch, which comprises an organ 21 annularly circulating the axle and moving in a reciprocating manner in accordance with FIGS. 3 and 4 so that it is alternately in sliding contact with the axle and that it alternately locks into the axle for rotating the axle along with the organ, depending on the direction of the movement. Such coupling arrangements, which may be based, for example, on an inclined, flexible or yielding cogging, are known as such. The organ 21 thus slides from the position according to FIG. 3 to the position according to FIG. 4 on the axle 20, which remains stationary, but as the organ returns back to the position in FIG. 3, it locks into the axle rotating it along one step counter clockwise. Thus, the axle 20 steps counter clockwise, rotating the washing arms 15 (FIGS. 1 and 2) so that they alternately connect different filtering elements 5 to the washing stage.

The annular organ 21 circulating the axle 20 is provided with two protruding arms 22, 23 arranged opposite each other, the one arm 22 being articulated to the piston 25 moving in the cylinder 24. The piston 25 is moved in the cylinder 24 back and forth utilising the higher pressure of the filtered flow present in the filtering room of the apparatus and the lower pressure of the washing channels 16, by connecting these to the cylinder alternately in different sides of the piston. From the side of the filtered flow, the filtering room is in contact with the casing 19 containing the freewheel clutch through the channel 26 (FIG. 1) so that the casing is filled with the filtered substance, such as lubricating oil. Respectively, a connection is built from the casing 19 to the flushing channels 16 through the channel 27. The piston 25 is controlled with the main valve 28 and two control valves 29, 30 controlling it. The main valve 28 is connected to the cylinder 24 at different sides of the piston 25 driving the freewheel clutch using the tubes 31, 32. In the figures, the leftmost control valve 29 is connected to the front end of the main valve 28 with the tube 33, and the rightmost control valve 30 is connected to the back end of the main valve with the tube 34. Further, the main valve 28 and the control valves 29, 30 are connected to the said channel 27 in the lower pressure with the tubes 35, 36, 37, 38.

In the freewheel clutch position according to FIG. 3, the arm 23 of the actuator 21 has pressed the piston 39 inside the leftmost control valve 29 against the spring into a position in which it releases the higher pressure in the casing 19 from the assembly 40 into the tube 33 and from there to the front end of the main valve 28, in which it has pushed the piston of the main valve to a position in which the pressure in the casing 19 has connected from the assembly 42 to the tube 31, which connects the pressure with the cylinder 24 to the right side of the piston 25 driving the freewheel clutch. At the same time, the back end of the main valve 28 is connected to the lower pressure in the channel 27 through the tube 34, the right control valve 30 and the tube 38. The movement of the piston 41 of the main valve 28 connects the cylinder 24 to the said lower pressure from the left side of the piston 25 through the tube 32, the main valve and the tube 35.

Connecting the pressure in the casing 19 through the tube 31 to the cylinder 24 at the right side of the piston 25 now makes the piston 25 to move to the left in the figures so that the piston and the organ 21 driving the axle 20 slide into the position in FIG. 4. In this case, the actuator arm 23 presses the right control organ 30, the structure of which is the mirror image of the left control valve 29, against the spring of the inner piston 43 to a position, in which it connects the pressure in the casing 19 through the tube 34 to the back end of the main valve 28, in which the pressure moves the piston 41 so that the tube 32 in its turn connects to the higher pressure in the casing 19 through the assembly 42, and the tube 31 is connected to the lower pressure in the channel 27 through the main valve 28 and the tube 36. At the same time, the movement of the arm 23 has let the piston 39 of the left control valve 29 to move to the right, pushed by the spring, so that the movement of the piston 41 of the main valve 28 has been made possible as the front end of the main valve has connected to the lower pressure in the channel 27 through the tube 33, the left control valve 29 and the tube 37.

Coupling the higher pressure in the casing 19 in the position according to FIG. 4 to the left end of the cylinder 24 makes now the piston 25 and with it also the actuator 21 and the axle 20 locking into it to return counter clockwise into the position in FIG. 3 at the same time as the movement of the piston 43 of the right control valve 30 couples the back end of the main valve 28 to the lower pressure in channel 27 for allowing the movement of the piston 41 of the main valve. The actuator arm 23 presses the piston 39 of the left control valve 29 to a position, in which it couples the pressure in the casing 19 to the tube 33 leading to the front end of the main valve 28. Thus, the rotating mechanism has returned to its initial position, after which its operation continues in the way that is described above.

The duration of the washing periods may be adjusted by stopping the washing arm 15 at the place of the element 5 to be washed for a desired period. The adjustment may be achieved, for example, with flow controller valves (not shown) installed into the tubes 31 and 32, which slow down the reverse stroke of the piston 25 of the cylinder 24, so that the arm 15 stays stationary during the movement in question. Alternative ways for adjusting the rotating movement of the arm 15 may include the adjustment of the pressure prevailing in the casing by choking the flow going into or out from the cylinder 24 in the channels 26 and 27 with a valve or valves placed in the channel 26.

Figure 5:
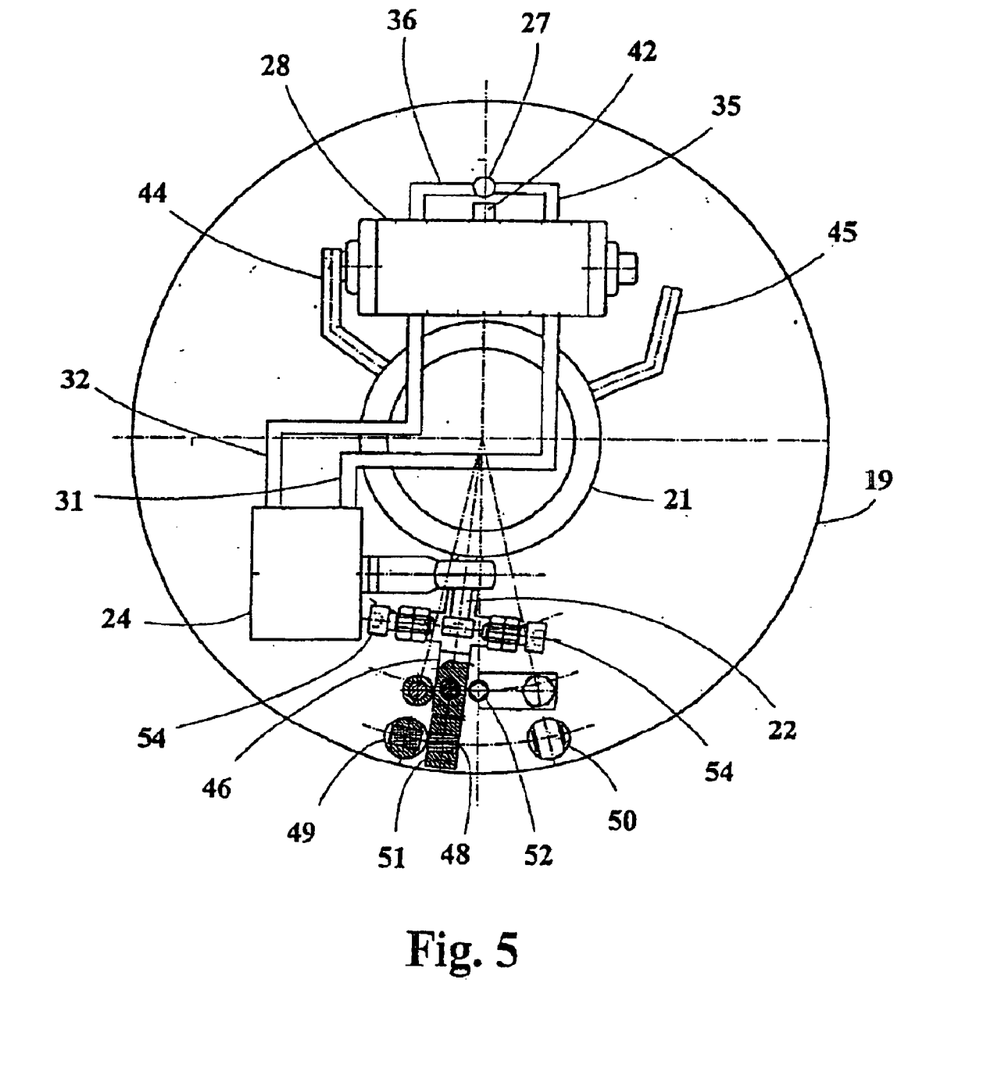
FIG. 5 shows the freewheel clutch of a second embodiment of the invention, with the related control valve, the coupling movement being in the other extreme position.
Figure 6:
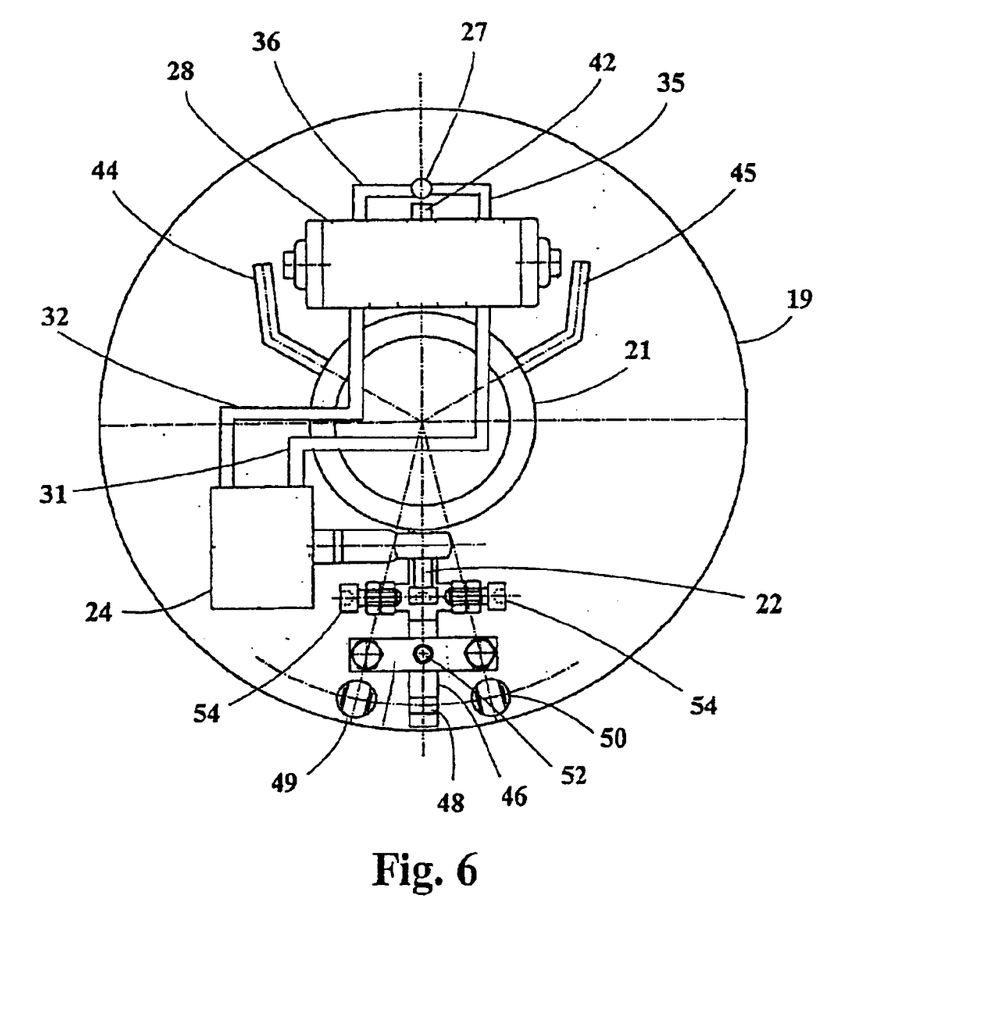
FIG. 6 shows the freewheel clutch of FIG. 5 in the middle position between the extreme positions of its movement.
Figure 7:
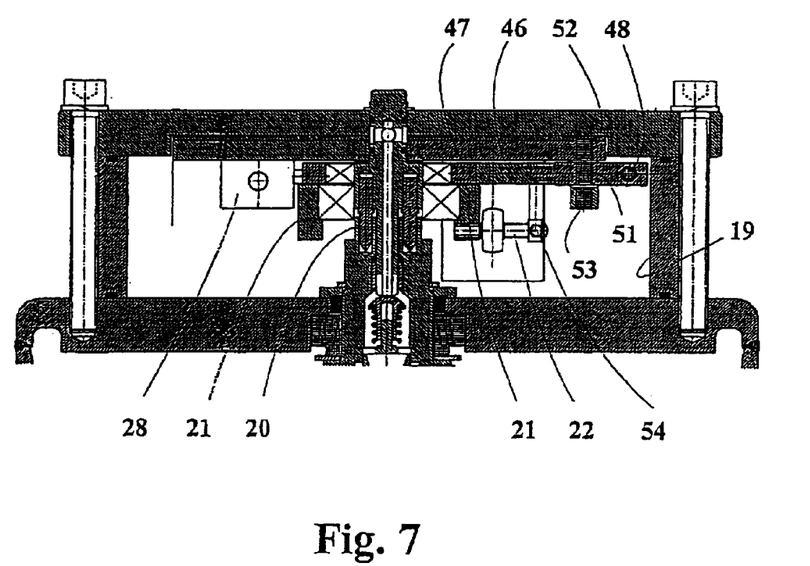
FIG. 7 is a vertical section of the coupling apparatus of FIGS. 5 and 6.

FIGS. 5-7 show an alternative control arrangement for the freewheel clutch for rotating the axle 20 and the washing arms of the filtering apparatus. For the part of the reciprocating coupling ring 21, piston cylinder 24, valve 28, and the tubes 31, 32 between the valve and the piston cylinder, the flow assembly 27 leading into the washing channels, and the tubes 35, 36 leading into it from the valve 28, the structure in FIGS. 5-7 corresponds to that shown above in connection of FIGS. 3 and 4, and therefore, they are not explained in more detail here.

Compared with FIGS. 3 and 4, the substantial difference in FIGS. 5-7 is that the valve 28, which corresponds to the main valve 28 in FIGS. 3 and 4, forms the only control valve of the system. In FIGS. 5-7, the control valves 29, 30 in FIGS. 3 and 4 are replaced with two protruding arms 44, 45 belonging to the rotating parts of the freewheel clutch, which along with the reciprocating rotating movement transfer the piston of the valve 28 back and forth between the two positions so that the higher pressure in the washing channels and the flow assembly 27 and the lower pressure in the casing 19 of the freewheel clutch, containing the valve 28, are alternately directed to different sides of the piston in the cylinder 24, maintaining thus the reciprocating movement of the ring 21 and the parallel stepping rotating movement of the axle 20. FIG. 5 shows the position of the ring 21 and the left arm 44, in which the arm has pushed the piston of the valve 28 into the extreme right position of the piston. In FIG. 6, the piston of the cylinder 24 has rotated the ring 21 counter clockwise by pushing the arm 22 to the half-way of the movement, in which the arms 44, 45 driving the valve 28 are both detached from the ends of the valve. As the rotating movement continues further, the right arm 45 pushes the piston of the valve 28 to the position extremely in the left, so that the pressures in different sides of the piston of the cylinder 24 switch places and start the reverse stroke of the piston and the rotation of the ring 21 clockwise back into the position according to FIG. 5.

The freewheel clutch controlled with the pressure difference has the problem that if the pressure difference is small and/or if there is friction in the moving parts of the mechanism, it easily occurs that the piston of the cylinder 24 begins to move but it does not have enough strength to complete the movement, but it stops without achieving the rotation of the axle 20. It may also happen that the strength of the arm 44, 45 is not sufficient to move the piston of the valve 28, which is the condition for the continuance of operation of the apparatus. These problems have been eliminated with the structure utilising magnets, which will be described next.

Besides the clutch ring 21 rotated by the arm 22 of the piston cylinder 24 pivoted to the axle 20, the coupling comprises a separate coupling ring 47 provided with the crank arm 46 of its own, which is also pivoted to rotate the axle 20. The arms 44, 45 moving the piston of the valve 28 are attached to the latter ring 47. The rotation of the arm 46 and the coupling ring 47 is achieved with the help of magnets in the arm installed stationarily in relation to the casing 19. The end 46 of the arm is provided with a magnet 48, which is attracted by the magnets 49, 50 in FIGS. 5 and 6 installed stationarily to the ends of the path. Slightly in the direction of the coupling ring 47, the arm 46 comprises a second magnet 51, with two repelling magnets 52, 53 placed above and below. The three magnets 51, 52, 53 mentioned last are situated opposite each other as the arm 46 is in the half-way of its movement according to FIG. 6.

In the initial position of the rotation of the coupling ring 21 in FIG. 5, the attracting magnets 48 and 49 have a decelerating effect to the rotary movement. When transferring from the initial position in FIG. 5 to the position in FIG. 6, in which the rotation of the ring 21 is half-way, the attractive force of the magnets 48 and 49 decreases as the distance between them grows at the same time as the repelling force of the magnets 51–53 increases as they move closer to each other. The added effect of the magnets thus resists the rotation of the ring 21.

The idea of operation of the rotating mechanism is, however, that the rotation performed by the piston of the cylinder 24 is limited only to the transfer of the arms 22 and 46 from the initial position in FIG. 5 to the middle position of the movement in FIG. 6. At this stage, the arms 22 and 46 and the coupling rings 21 and 47 rotate together. In the middle position of the movement, the effect of the magnets is labile, and as soon as the middle position of the movement has been passed, the magnets 51–53 repelling each other give a strong push forwards for the movement of the arm 46, the movement being further strengthened by the attracting magnets 48 and 50 coming closer to each other. In this connection the arm 46, which until now has moved along with the arm 22 pushed by the piston of the cylinder 24, is able to move in front of the arm 22 pushed by the piston within the tolerance adjusted by the control screws 54 seen in FIGS. 5 and 6, and to finish the rotating movement by rotating the coupling ring 47. Thus, after its half-way, the rotating movement is no longer dependent on the pressure difference prevailing in the piston cylinder 24, and the rotating movement accelerated towards the end by the magnets does not tend to remain unfinished, as could happen when operating merely on the pressure difference and the cylinder piston.

The working mechanism of the freewheel clutch in FIGS. 5-7 explained above is inventive in the opinion of the applicant, and besides the stepping rotation of the axle of the washing organ in the filtering apparatus, it may applied to any other application, in which the stepping rotary movement is controlled on the pressure difference.

It is obvious for one skilled in the art, that the various embodiments of the invention are not limited to the ones shown as examples above, but they may vary within the scope of the enclosed claims. Especially the arrangement and detailed structure of the filtering elements of the apparatus, which are not the primary object of the invention, may deviate from the ones shown in the drawings. Neither does the invention require that washing organs be placed to both ends of the filtering elements, but if may also be sufficient to provide a rotating washing organ to one end of the elements, to which each of the filtering elements will be coupled in its turn.

In the mechanism shown in FIGS. 5-7, the attracting magnets 48–50 or the repelling magnets 51–53 may by themselves be enough to achieve the effect intensifying the necessary rotary movement.

What is claimed is:

1. A filtering apparatus, comprising an inlet channel for flow to be filtered, an outlet channel for filtered flow, a number of parallel filtering elements, into which flow to be filtered may be directed so that infiltration occurs through a jacket of an element, and at least one rotating washing organ connecting alternately to the different elements for forming a discharge channel for backflushing of the elements generated with the pressure of the filtered flow; and a freewheel clutch connected to a rotating axle of the washing organ, wherein the clutch converts reciprocating movement generated with a piston and maintained by pressure of the flow in the apparatus and alternating lower pressure into a continuously parallel, stepping rotary movement of the axle, wherein in the apparatus includes channels and related control valves for coupling the pressure of the filtered flow and the lower pressure alternately to different sides of the piston without operator intervention.

2. The apparatus according to claim 1, wherein the freewheel clutch comprises a coupling organ driving the rotating axle of the washing organ, which is alternately in sliding contact with the axle and which alternately locks into the axle for rotating the axle, the said coupling organ being articulated to said piston reciprocating on the alternating pressure.

3. The apparatus according to claim 1, wherein the pressure in the discharge channel of the backflushing flow is coupled as counterpressure for the pressure of the filtered flow.

4. The apparatus according to claim 1, wherein the filtering elements are cylindrical and arranged on one or several circumferences surrounding the rotating axle of the washing organ.

5. The apparatus according to claim 4, wherein the washing organ consists of one or more tubular washing arms transverse to the rotating axle and connecting alternately to the ends of different filtering elements.

6. The apparatus according to claim 1, wherein the apparatus includes two or more washing organs connected to the same rotating axle for simultaneous backflushing of two or more filtering elements.

7. The apparatus according to claim 6, wherein the apparatus comprises a washing organ at both ends of the parallel filtering elements, and that the washing organs are made as one piece with the rotating axle.

8. The apparatus according to claim 1, wherein the apparatus is adapted for filtering a fuel or luboil of a motor.

9. The apparatus according to claim 1, wherein the clutch is in operative engagement with the control valves during movement of the clutch, and wherein the control valves direct the pressure of the filtered flow and the lower pressure to respective sides of the piston when the clutch engages one of the control valves, and to opposite respective sides of the piston when the clutch engages another of the control valves.

10. The apparatus as in claim 9, wherein the clutch includes at least one arm for operatively and alternately engaging the control valves.

11. A method for washing filtering elements in a filtering apparatus, which comprises an inlet channel for flow to be filtered, an outlet channel for the filtered flow, and a number of parallel filtering elements, into which the flow to be filtered is directed so that infiltration occurs through an element jacket, in which method the washing is achieved by connecting different elements alternately to a rotating washing organ so that the washing is carried out as backflushing directed to the washing organ with the pressure of the filtered flow, and a rotating axle of the washing organ is rotated in a stepping manner continuously in the same direction using a reciprocating mechanism, the reciprocating movement of which is generated with and maintained by the pressure of the flow prevailing in the apparatus and alternating lower pressures, wherein the reciprocating mechanism reciprocates without operator intervention.

12. The method according to claim 11, wherein the axle of the washing organ is rotated with the pressure of the filtered flow and with the lower pressure alternating with the filtered flow pressure.

13. The method according to claim 11, wherein the steps of the washing organ are generated with a freewheel clutch, comprising a coupling organ driving the rotating axle of the washing organ, the coupling organ being alternately in sliding contact with the axle and alternately locking into the axle for rotating the axle, the moving of the said coupling organ being carried out with a piston articulated with the coupling organ, the piston being moved back and forth by connecting pressures of different elements alternately to different sides of the piston.

14. The method assembly according to claim 11, wherein the clutch engages a control valve, during movement of the clutch, and wherein the control valve directs the pressure of the filtered fluid and the lower pressure to alternate sides of the piston to cause the piston to reciprocate without operator intervention.

15. A filtering apparatus, comprising an inlet channel for flow to be filtered, an outlet channel for filtered flow, a number of parallel filtering elements, into which flow to be filtered may be directed so that infiltration occurs through a jacket of an element, and at least one rotating washing organ connecting alternately to the different elements for forming a discharge channel for backflushing of the elements generated with the pressure of the filtered flow; and a freewheel clutch connected to a rotating axle of the washing organ, wherein the clutch converts reciprocating movement generated with and maintained by pressure of the flow in the apparatus and alternating lower pressure into a continuously parallel, stepping rotary movement of the axle, further including means for providing the reciprocating movement without operator intervention.

16. The apparatus as in claim 15, wherein said means for providing includes valve means for controlling flow to the reciprocating means, wherein the clutch is in operative engagement with the valve means during movement of the clutch.

17. The apparatus as in claim as in claim 16, wherein the clutch includes at least one arm for operatively engaging the valve means.

18. A filtering apparatus, comprising an inlet channel for flow to be filtered, an outlet channel for filtered flow, a number of parallel filtering elements, into which flow to be filtered may be directed so that infiltration occurs through a jacket of an element, and at least one rotating washing organ connecting alternately to the different elements for forming a discharge channel for backflushing of the elements generated with the pressure of the filtered flow; and a freewheel clutch connected to a rotating axle of the washing organ, wherein the clutch converts reciprocating movement generated with and maintained by pressure of the flow in the apparatus and alternating lower pressure into a continuously parallel, stepping rotary movement of the axle, further including a reciprocating mechanism and valve means controlling the reciprocating movement of the reciprocating mechanism, the clutch operatively engaging the valve means during movement of the clutch to direct the pressure of the filtered flow and the lower pressure alternately to different sides of the reciprocating mechanism without operator intervention.

19. A method for washing filtering elements in a filtering apparatus, which comprises an inlet channel for flow to be filtered, an outlet channel for the filtered flow, and a number of parallel filtering elements, into which the flow to be filtered is directed so that infiltration occurs through an element jacket, in which method the washing is achieved by connecting different elements alternately to a rotating washing organ so that the washing is carried out as backflushing directed to the washing organ with the pressure of the filtered flow, and a rotating axle of the washing organ is rotated in a stepping manner continuously in the same direction using a reciprocating mechanism, the reciprocating movement of which is generated with and maintained by the pressure of the flow prevailing in the apparatus and alternating lower pressure, wherein the reciprocating mechanism moves the clutch in one direction into operative engagement with control means, the control means then redirecting the pressure of the filtered fluid and the lower pressure to alternate sides of the reciprocating mechanism to cause the clutch to move in an opposite direction and again into operative engagement with the control means.

* * * * *